United States Patent [19]

Huh

[11] Patent Number: 5,261,231
[45] Date of Patent: Nov. 16, 1993

[54] INTAKE/EXHAUST AIR PRESSURE BALANCER AND METHOD OF REDUCING INTAKE/EXHAUST AIR PRESSURE RESISTANCE

[76] Inventor: Chan-Hoi Huh, 18Tong-3Ban, 124-40, Bugae-2dong, Buk-gu, Inchon-si, Rep. of Korea

[21] Appl. No.: 861,443

[22] Filed: Apr. 1, 1992

[30] Foreign Application Priority Data

Apr. 2, 1991 [KR] Rep. of Korea .................. 91-5248
May 14, 1991 [KR] Rep. of Korea .................. 91-7759

[51] Int. Cl.⁵ ........................................... F02B 27/02
[52] U.S. Cl. ................................... 60/312; 60/313; 123/52 MB
[58] Field of Search ............ 60/312, 313; 123/52 MB; 138/26

[56] References Cited

U.S. PATENT DOCUMENTS

| | | | |
|---|---|---|---|
| 1,632,880 | 6/1927 | Burtnett | 123/52 MB |
| 2,631,614 | 3/1953 | Stephens | 138/26 |
| 4,483,282 | 11/1984 | Sakaoka | 123/52 MB |
| 4,813,232 | 3/1989 | Hitomi | 60/313 |
| 4,867,109 | 9/1989 | Tezuka | 123/52 MB |

FOREIGN PATENT DOCUMENTS

| | | | |
|---|---|---|---|
| 152153 | 8/1985 | European Pat. Off. | 60/312 |
| 328514 | 5/1930 | United Kingdom | 138/26 |

*Primary Examiner*—Douglas Hart
*Attorney, Agent, or Firm*—Oblon, Spivak, McClelland, Maier & Neustadt

[57] ABSTRACT

The specification related to an intake/exhaust air pressure balancer connected to an intake apparatus and/or an exhaust apparatus of an internal combustion engine and a method of reducing the intake/exhaust air pressure resistance. The intake/exhaust air pressure balancer in this invention is essentially consisted of a storage tank and a bypass pipe. Minimization of an intake air pressure resistance can be achieved by temporarily storing an intaken air reversely flowed at the end of an intake stroke followed by reintake of the air into a cylinder during the next intake stroke, while minimization of an exhaust gas pressure resistance can be expected by temporarily storing a rapidly expanding exhausted gas discharged during an exhaust stroke followed by redischarge through an exhaust equipment under a reduced exhaust gas pressure.

2 Claims, 3 Drawing Sheets

INTAKE/EXHAUST AIR PRESSURE BALANCER AND METHOD OF REDUCING INTAKE/EXHAUST AIR PRESSURE RESISTANCE

BACKGROUND OF THE INVENTION

This invention is concerned with an intake/exhaust air pressure balancer connected to an intake system which induces the mixture of air and fuel or the air into a cylinder and to an exhaust system which draws off the combustion gas expanded in a cylinder to the environment, and a method of reducing resistance built up in the process of internal combustion engine cycles for automobiles or heavily equipped vehicles.

In general, operational cycles of an internal combustion engine are composed of an intake stroke inducing the mixture of air and fuel into a cylinder in case of a carburetor-type internal combustion engine, or the air into a cylinder or an intake manifold in case of an injection-type internal combustion engine; a compression stroke compressing the intaken mixture or air (hereinafter referred to as "intaken air"); and an explosion stroke which enables instant explosion of the compressed mixture of air and fuel, or the air, upon applying electric ignition at a proper time near the end of the compression stroke, or upon spraying fuel onto the compressed air, respectively, because of ignition and combustion of the fuel therein. When fuel is instantly ignited and exploded, the intaken air in a cylinder is rapidly expanded; this rapidly expanded combustion gas moves a piston to transform heat energy into mechanical energy; and at the end of the expansion stroke, an exhaust valve is open to draw off the gas in the cylinder to the environment through an exhaust manifold and an exhaust pipe, and this process is an exhaust stroke. This stage is connected to the next intake stroke, and these whole stages are repeated in cycle.

Among the operational cycles of the above internal combustion engine, during an intake stroke inducing the gas into a cylinder, if a crank shaft is rotated, the piston is lowered in the cylinder, and an inlet valve is open thus making the inside of the cylinder in a vacuum state. Due to this vacuum power, a negative pressure is built in the intake apparatus, and the intaken air induced through an air-cleaner or a carburetor is sucked into each cylinder through an intake manifold and then an open intake valve.

Therefore, in the intake stroke described in the above, due to the vacuum power in the cylinder, the intaken air is rapidly and strongly sucked into the inside of the cylinder through the intake manifold; if an intake valve is closed at the end of an intake stroke, the intaken air being sucked with a strong suction power is then collided to a closed intake valve and reflected; and the intaken air thus reflected and flowed out in an opposite direction is then reversely flowed toward the intake manifold and collided with the intaken air which is being induced constantly. This collision creates a great deal of resistance and interference with the intaken air which has been flowed in at the next intake stroke as well as loud noise, thus reducing the power of an internal combustion engine.

Thus, in order to avoid interference and resistance inherent to the intaken air at the stage of an intake stroke, in the past, the spacial interval between a cylinder for the intake stroke and that for the next intake stroke has been left as widely as possible and a large space for the intake manifold has been allowed to increase the volume of the intaken air. However, this method had been proved to be a failure because there was an increase in resistance in proportion to the quantity of the intaken air reversely flowed out.

Further, among the operational cycles of the internal combustion engine, during an exhaust stroke, the gas exhausted through an exhaust equipment was subject to heavy vibration due to a rapid expansion of the gas resulting from changes in the combustion pressure and quantity of the flowed air under high temperature and high pressure. In order to minimize vibration due to such rapid overexpansion of the exhausted gas, in the past, a method of reducing pumping loss (intake loss-+exhaust loss) by attempting to decrease resistance in the exhaust path and thus allowing a smooth expansion of the gas, and of installing a muffler to reduce noise, had been employed.

However, in spite of such attempts to improve an exhaust equipment, it has not been possible to resolve problems of heavy noise and low engine power coming from vibrations inherent to the engine due to bending of the exhaust manifold and exhaust pipe and due to suspension system of the exhaust pipe as well as vibration inherent to road surfaces.

SUMMARY OF THE INVENTION

It has now been discovered that the present invention provides with an intake/exhaust air pressure balancer which enables minimization of intake air pressure resistance and exhaust gas pressure resistance when connected to the intake and exhaust equipments. The invention also provides a method of reducing intake/exhaust air pressure resistances.

The intake/exhaust air pressure balancer according to the present invention is composed of a storage tank which enables temporary storage of the intaken air reversely flowed out of an intake equipment and the overexpanded air produced in an exhaust equipment, and of a bypass pipe which enables suction of the intaken air or overexpanded gas into the storage tank or discharge of the intaken air or overexpanded gas stored at the storage tank. One end of the bypass pipe is fixed to the storage tank, while the other end is made to be connected to the intake equipment or the exhaust equipment.

The intake/exhaust air pressure balancer thus made can be connected either to an intake pipe or intake manifold or to an exhaust manifold or exhaust pipe. When connected to the former, it enables minimization of the intaken air pressure resistance by allowing temporary storage of reversely flowed intaken air while the intake valve is being closed at the end of the intake stroke followed by reintake of the air into the cylinder during the next intake stroke. When connected to the latter, it enables minimization of the exhaust air pressure resistance by allowing temporary storage of a rapidly expanding exhaust gas (overexpanded gas) discharged during the exhaust stroke followed by redischarge through the exhaust equipment under a reduced exhaust pressure, which results in smooth expanding of the gas.

The intake/exhaust air pressure balancer according to the present invention can be attached to an intake equipment only when minimization of the intake air pressure resistance is desired; it can be attached to an exhaust equipment only when minimization of the exhaust air pressure resistance is desired; or it either can be attached to the intake and exhaust equipments at the same time when concurrent minimization of the intake and exhaust air pressure resistances is desired.

BRIEF DESCRIPTION OF THE DRAWINGS

The figures in the present invention are explained below.

DETAILED DESCRIPTION OF THE INVENTION

The present invention is described in detail below with reference to the accompanying drawings.

Figure 1:
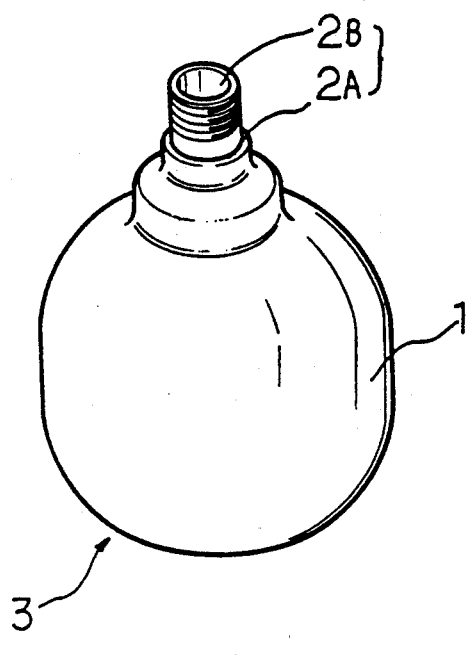
FIG. 1 is a perspective view of an intake/exhaust air pressure balancer of the present invention.

The intake/exhaust air pressure balancer of FIG. 1 is composed of a storage tank (1) which enables temporary storage and redischarge of the intaken air reversely flowed into the intake apparatus at the stage of the intake stroke or the exhaust gas overexpanded in the exhaust apparatus by bypassing it, along with a bypass pipe (2) which enables inducing the intaken air or exhaust gas to the storage tank (1). One end (2A) of the bypass pipe (2) is fixedly connected to the storage tank (1), while the other end is made to be a coupling part (2B) so that it can be connected to an intake apparatus or an exhaust apparatus. There are several ways of making a coupling part (2B): screwing can be applied to the coupling part of the balancer as well as to the holes of the intake and exhaust apparatus, and both parts can be connected to each other by screw-driving; the coupling part (2B) can be directly welded and fixed to the intake and exhaust apparatus; or other various joint fixing methods applicable to pipes can be modified and used for this coupling part. The storage tank (1) and bypass pipe (2) can be manufactured separately and fixedly connected by sealing, or they can be manufactured as an entity by casting or injection molding.

Figure 2:
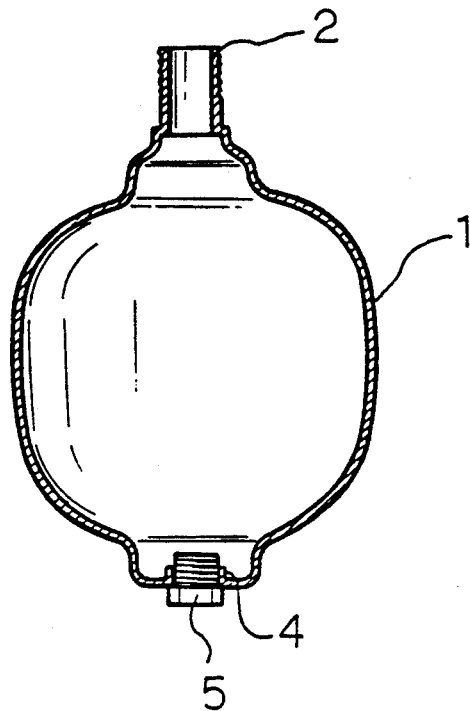
FIG. 2 is a cross-sectional view of an intake/exhaust air pressure balancer of the present invention.

FIG. 2 is a cross-sectional view of an intake/exhaust air pressure balancer which is similar to that of FIG. 1. One end of the storage tank (1) has a hole, and a fitting device (4) is made and applied to this hole. This hole can be used for a few other purposes: a guage such as a pressure gauge can be attached to the fitting device (4) in order to measure the intake or exhaust air pressure; the hole can be used as an exit for water or impurities in the storage tank; also, if more than one balancers are installed at the intake and exhaust apparatus, the holes of the balancers can be used as connecting means of the balance pipes when more than one balancers need to be connected to the balance pipes. The fitting device (4) can be closed with a stopper (5) when not in use.

Figure 3:
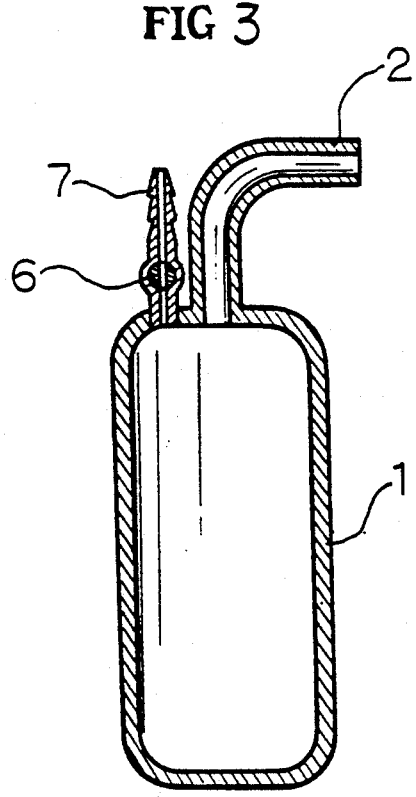
FIG. 3 is a cross-sectional view of another example of an intake/exhaust air pressure balancer of the present invention.

FIG. 3 is another example of an intake/exhaust air pressure balancer. This balancer is composed of a cylindrical storage tank (1), a bending bypass pipe (2) which is fixed to the storage tank (1) by sealing, and a water supply pipe (7) with a cock (6) which is also attached to the storage tank (1). An intake/exhaust air pressure balancer, to which a water supply pipe (7) is attached, can be used for the exhaust equipment only. The balancer is connected to the exhaust pipe of the exhaust apparatus, and water can be supplied through the water supply pipe (7), as necessary, in order to clean the inner parts of the balancer, exhaust pipe, and muffler.

Illustrated next with reference to the accompanying drawings is an operational method of an intake/exhaust air pressure balancer attached to the intake or exhaust apparatus to reduce the intake and exhaust air pressure.

The position and number of the intake/exhaust air pressure balancers of the present invention to be installed at the intake and exhaust apparatus are determined based on various factors: for an intake apparatus, quantity and standards for an intake manifold, shape and standards for an intake pipe, quantity and pressure of the intaken air, distribution of the intaken air, its starting capacity, etc. should be taken into consideration before it is designed, or the specification obtained from experimental results should be referred to, in order to minimize resistance of the intaken air; for an exhaust apparatus, quantity and standards for an exhaust manifold, shape and standards for an exhaust pipe, quantity and pressure of the exhausted gas, collectability of the exhausted gas, exhaust interference among cylinders, etc. should be taken into consideration before it is designed, or the specification obtained from experimental results should be referred to, in order to minimize resistance of the exhausted gas. One or more intake/exhaust air pressure balancers are attached to an intake or exhaust equipment in series or in parallel according to these planning materials.

Once the position and number of the balancers to be installed are determined, a hole is made at the installment sites of the intake and exhaust apparatus to fix a bypass pipe of the balancer, and the coupling part of an intake/exhaust air pressure balancer is sealed to this hole.

Figure 4:
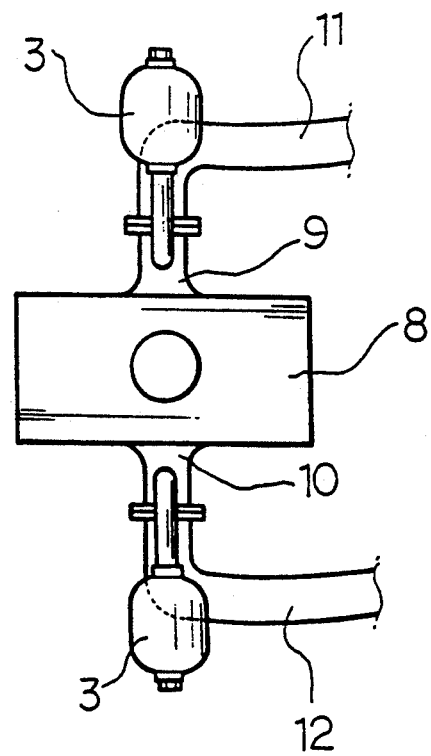
FIG. 4 is a plane view of an intake apparatus and an exhaust apparatus with each intake/exhaust air pressure balancer of the present invention attached thereto.

FIG. 4 shows two intake/exhaust air pressure balancers each attached to the intake manifold (9) of the intake apparatus and the exhaust manifold (10) of the exhaust apparatus of the engine (8). The installment direction of the balancers should be adjusted in such a way to allow efficient flow of the air or gas: for an intake apparatus, a balancer should be attached in a direction to induce the intaken air which had been reflected from the cylinder and reversely flowed out at the end of the intake stroke; for an exhaust apparatus, a balancer should be attached in a direction to induce the exhausted gas which had been discharged from the cylinder during the exhaust stroke.

Figure 5:
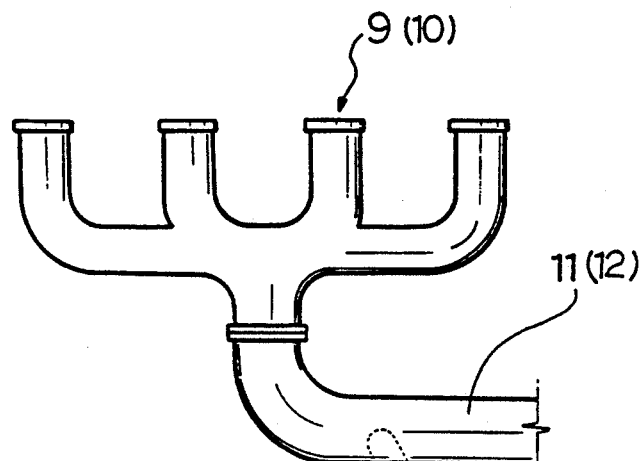
FIG. 5 is a simplified view of an example of a multi-cylinder intake apparatus or of a multi-cylinder exhaust apparatus with an intake/exhaust air pressure balancer of the present invention attached thereto.

FIG. 5 depicts one balancer (3) which is attached to an intake pipe (11) of an intake apparatus or an exhaust pipe (12) of an exhaust apparatus for a multi-cylinder engine.

Figure 6:
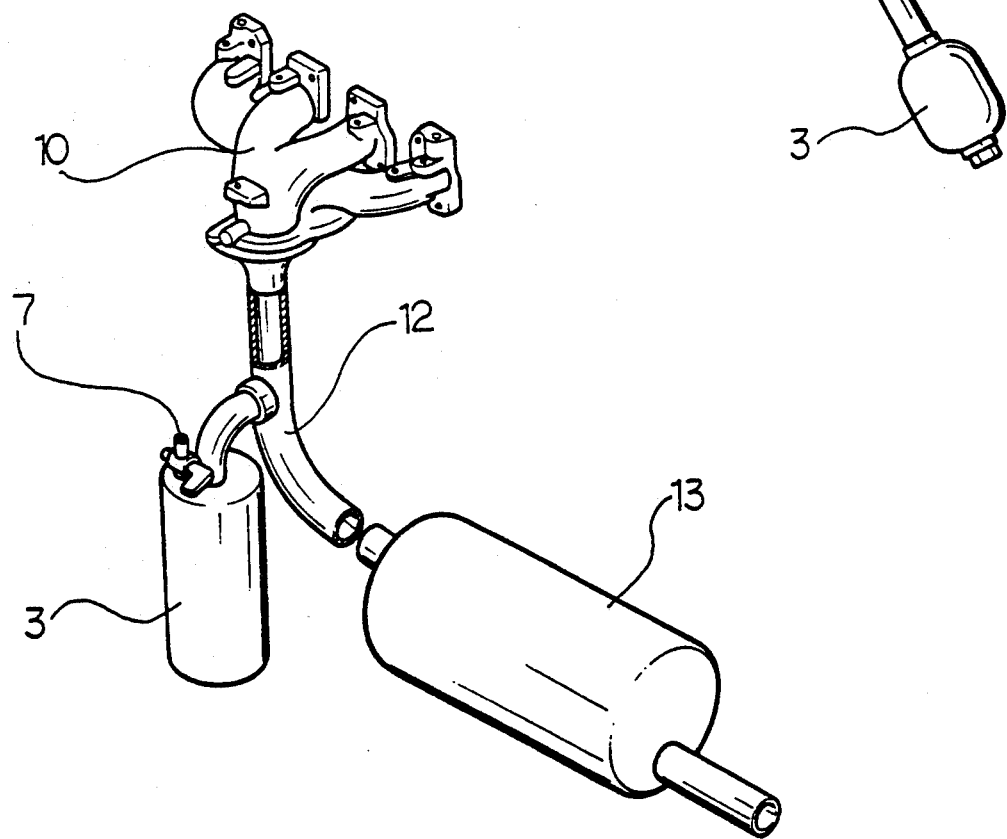
FIG. 6 is a perspective view of another example of an exhaust apparatus with an intake/exhaust air pressure balancer of the present invention attached thereto.

FIG. 6 shows one balancer (3) which is attached to an exhaust pipe (12) of an exhaust apparatus for a multi-cylinder engine. In this case, a balancer is equipped with a water supply pipe (7) in order to clean the muffler (13).

When an engine equipped with the intake/exhaust air pressure balancers at the intake and exhaust apparatus is started, the entire operational cycle is repeated continuously. During the operation, an intake valve at the head of a cylinder is open, and the interior of the cylinder becomes in a vacuum state while a piston is lowered in the cylinder. Due to this vacuum power, a negative pressure is built in the intake manifold, and the intaken air flowed in through an air-cleaner or a carburetor is induced into a cylinder through an intake pipe (11) and an intake manifold (9), and this process forms an intake stroke. At the end of the intake stroke, an intake valve at the head of a cylinder is closed, and the intaken air which has been strongly induced in the cylinder starts to reversely flow out. By inducing this reversely flowed-out intaken air to the storage tank (1) through a bypass pipe (2) of the balancer (3) and thus temporarily storing it at the storage tank (1), resistance and interference with the freshly flowed-in air can be minimized, which leads to the prevention of engine noise. The intaken air temporarily stored at the balancer is joined by the intaken air flowed into an intake pipe (11) through an air-cleaner or a carburetor during the next intake stroke and induced into the cylinder. By doing this, the air-fuel ratio between the air and fuel can be measured accurately. If this ratio can be improved during high-speed automobile driving, then automobile exhaust fumes can be reduced, which results in the increase in engine power and acceleration ratio.

During the exhaust stroke after completion of the intake, compression, and explosion strokes, the combustion gas burned inside of the cylinder is discharged to the environment through an exhaust manifold (10), an exhaust pipe (12), and then a muffler (13) during normal driving; whereas during starting of an engine or driving, idling of an engine and load running, vibration of an exhaust equipment, etc. where external or internal factors stimulate a rapid expansion of the exhausted gas due to changes in combustion pressure and quantity of flow, a portion of this overexpanded gas is induced into the storage tank (1) through the bypass pipe (2) of the balancer, and expansion impact and vibration of the overexpanded gas are then absorbed; on the contrary, when the pressure of the exhausted gas discharged to an exhaust apparatus is reduced, the stored gas temporarily stored at the storage tank (1) is restored to an exhaust pipe through a bypass pipe (2), and then discharged. Like this, by temporarily storing the overexpanded gas, reducing the exhaust air pressure, and attempting a smooth discharge of the gas, loss in engine power can be minimized; and by absorbing vibration due to overexpanded explosion, noise can be reduced.

Figure 7:
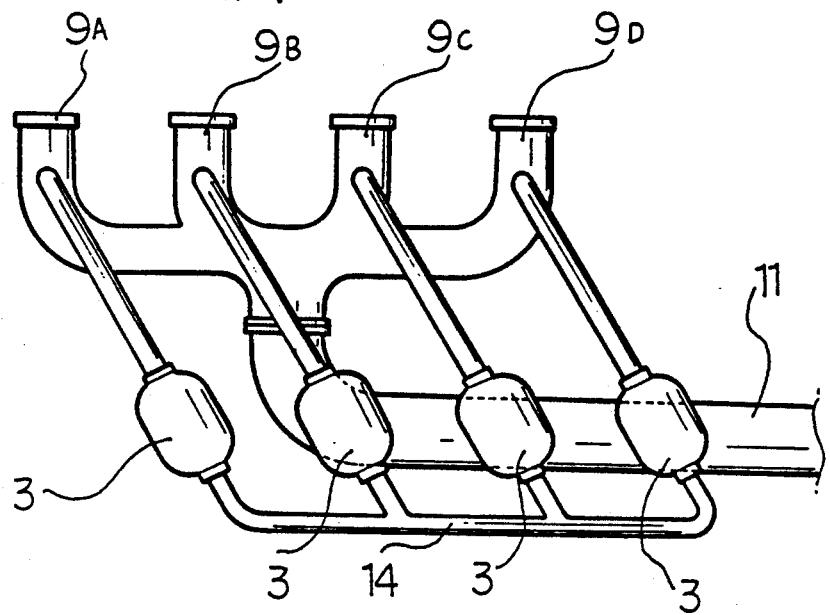
FIG. 7 is a simplified view of an example of the manifold distribution part of an intake apparatus or of an exhaust apparatus with each intake/exhaust air pressure balancer of the present invention attached thereto.

FIG. 7 is another example of a method of installing the balancer. This figure illustrates a multi-cylinder engine in which a balancer is attached to each of the four manifold distribution parts (9A) (9B) (9C) (9D) of an intake apparatus or an exhaust apparatus, and the four balancers are connected by a balance pipe (14), which permits free movement of the air or gas. By connecting the balance pipe (14) consecutively, the pressures among the balancers can be evenly redistributed. This installment method of the balancer is expected to improve the engine power in such a way that, in a multi-cylinder engine, as an operational cycle of each cylinder is non-concurrent in time, even distribution of the intake and exhaust pressures leading to each cylinder can be achieved, and at the same time, the intaken air reversely flowed out of each cylinder at the end of the first intake stroke is to be temporarily stored at the balancer and induced to the cylinder under the next intake stroke, thus enabling joint flow-in of the intaken air without interference with the freshly induced-in air.

Figure 8:
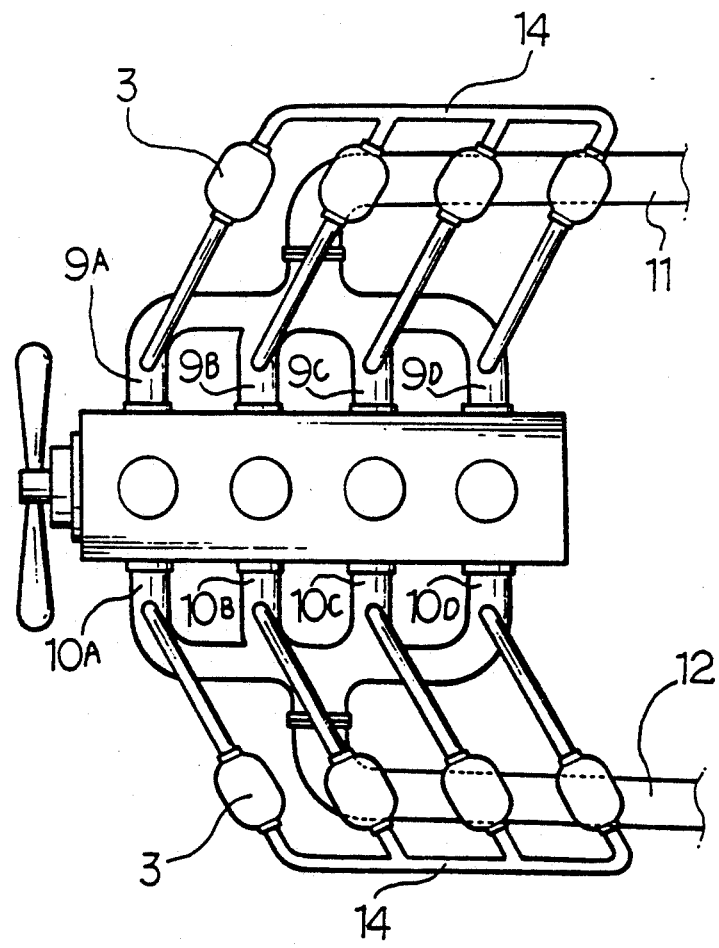
FIG. 8 is a simplified view of an example of the manifold distribution part of an intake apparatus and an exhaust apparatus with each intake/exhaust air pressure balancer of the present invention attached thereto.

FIG. 8 is another example of a method of installing a balancer. This figure depicts a multi-cylinder engine in which a balancer is attached to each of the four distribution parts (9A) (9B) (9C) (9D) of an intake apparatus as well as to each of the four distribution parts (10A) (10B) (10C) (10D) of an exhaust apparatus, after which a balance pipe (14) is connected to each balancer.

What is claimed is:

1. In a multi-cylinder internal combustion engine including a plurality of cylinders, a plurality of intake manifolds and a plurality of exhaust manifold ducts, the improvement comprising:
   a plurality of intake storage tanks storing remaining intake gas after charging of the cylinders, and discharging stored intake gas toward the cylinders at a next intake stroke;
   a plurality of bypass pipes, one end of each said bypass pipe being connected to one of said intake manifold ducts and another end of each said bypass pipe being connected to one of said intake storage tanks;
   an intake balance pipe connecting each of said intake storage tanks with one another, thereby balancing the gas pressure in each said intake storage tanks uniformly;
   a plurality of exhaust storage tanks storing exhaust gas exhausted from the cylinders at an exhaust stroke, and discharging stored exhaust gas toward the exhaust manifold ducts, thereby minimizing exhaust resistance;
   a plurality of bypass pipes, one end of each said bypass pipe being connected to one of said exhaust manifold ducts and another end of each said bypass pipe being connected to one of said exhaust storage tanks; and
   an exhaust balance pipe connecting each of said exhaust storage tanks with one another, thereby balancing the gas pressure in each said exhaust storage tanks uniformly.

2. The multi-cylinder internal combustion engine according to claim 1, further comprising:
   a water supply pipe with a cock installed for each of said exhaust storage tanks, thereby providing cleaning of an exhaust apparatus.

* * * * *